Figure 1:
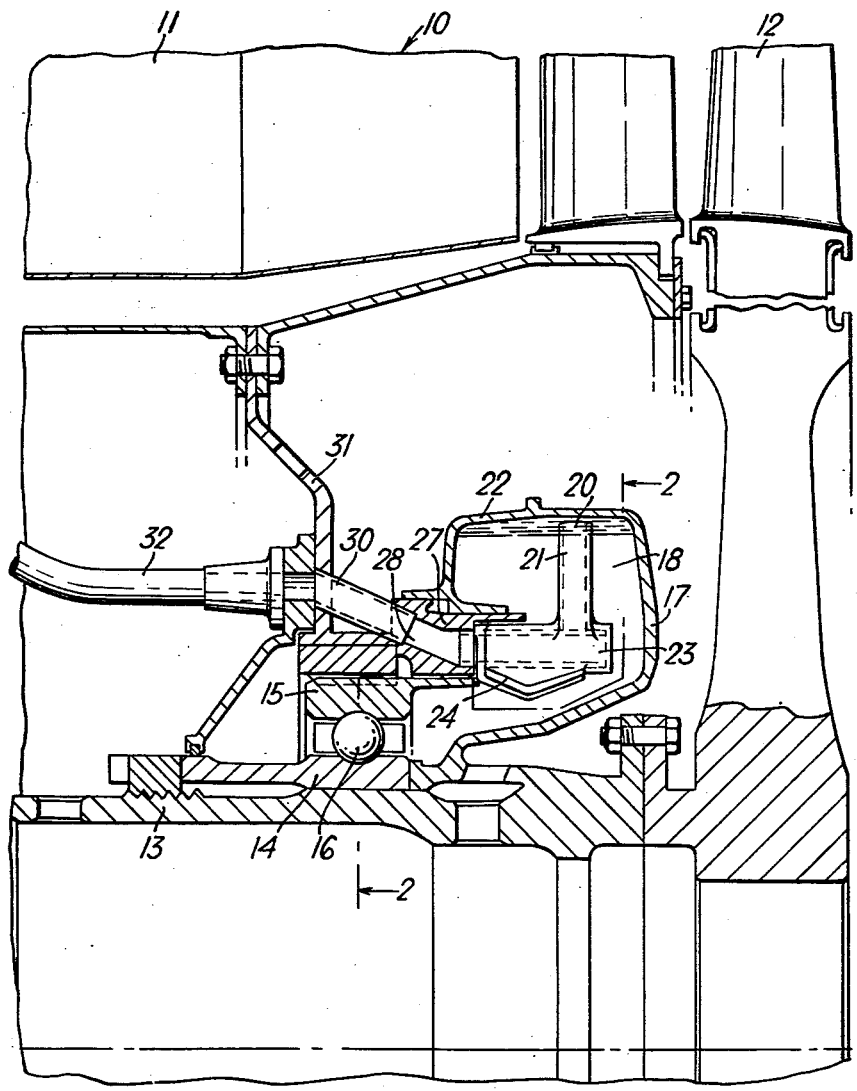

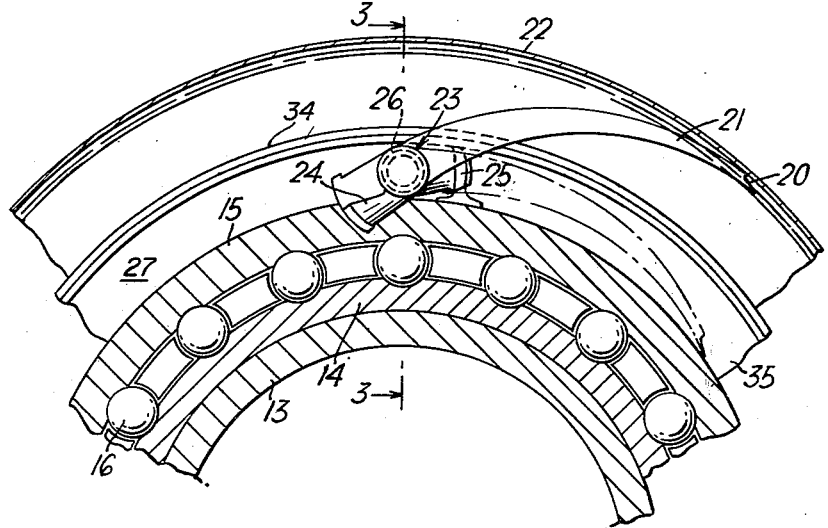
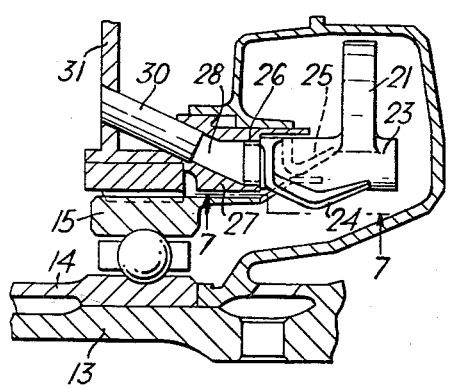
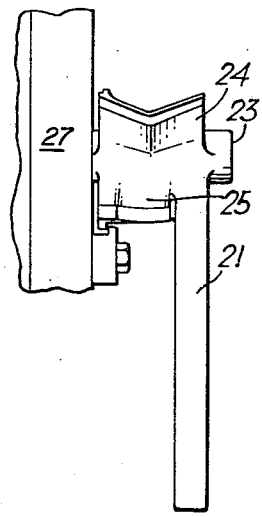

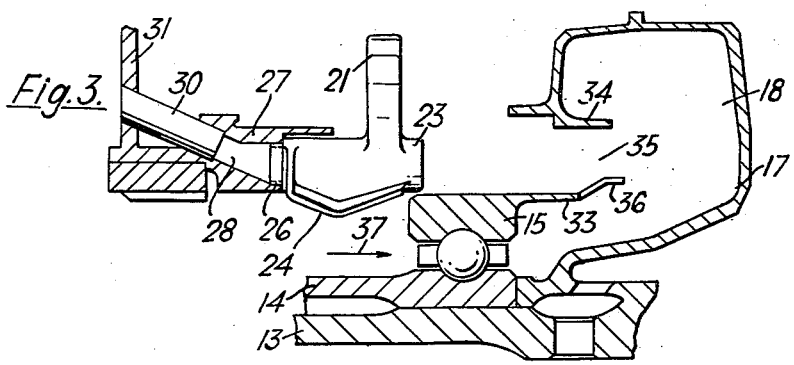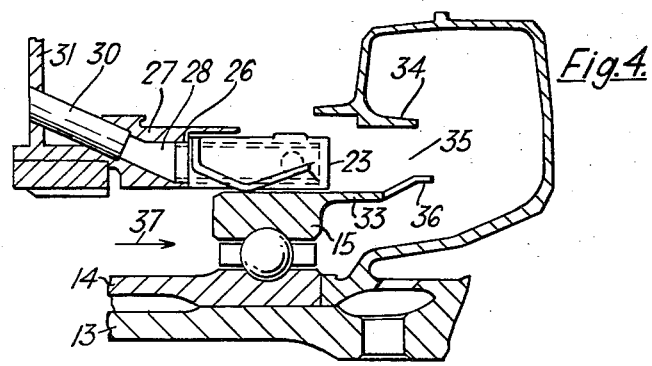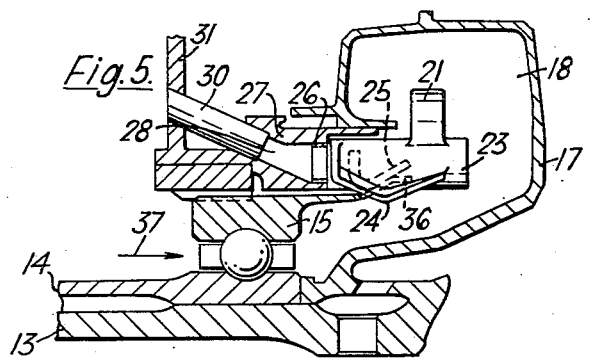

ically to the interior of the external wall of the sump chamber.

Preferably there are also cam means such that, when the pipe is presented to said opening and the pipe and sump chamber are moved relatively towards each other, the pipe is forced into or maintained in the said predetermined disposition.

The pipe may be carried by and communicate with a rotatable cylindrical member having outwardly extending flanges provided with cam faces, the cam faces being adapted to cooperate with abutment means which are fixed with respect to the sump chamber.

The apparatus may comprise a bearing to which the lubricant is supplied and from which it may drain to the sump chamber.

Preferably the apparatus comprises a shaft which is journalled within said bearing, the sump chamber being connected to or formed integrally with said shaft for rotation therewith.

The invention also comprises a gas turbine engine provided with the above-mentioned apparatus, the said shaft, for example, carrying a compressor and a turbine of said engine. Additionally, the invention comprises an aircraft provided with such a gas turbine engine.

The invention is illustrated, merely by way of example, in the accompanying drawings, in which:

FIGURE 1 is a broken away section through part of a gas turbine provided with apparatus according to the present invention, FIGURE 2 is a broken away section taken on the line 2—2 of FIGURE 1, FIGURE 3 is a broken away section taken on the line 3—3 of FIGURE 2 but with the various parts in a disassembled position just prior to assembly, FIGURES 4-6 are broken away sections similar to FIGURE 3 but showing the parts thereof in different relative positions as the parts are being assembled, and FIGURE 7 is a broken away view taken on the line 7—7 of FIGURE 6.

Referring to the drawings, a gas turbine jet engine 10 for the propulsion of an aircraft (not shown) comprises in flow series a compressor (not shown), combustion equipment 11, and a turbine 12.

The turbine 12 and the compressor are mounted on a common shaft 13. The shaft 13 which is journalled within an engine front bearing (not shown), is fitted within a sleeve 14, the sleeve 14 being journalled within a sleeve 15 which forms part of an engine rear bearing. Between the sleeves 14, 15 there is a ball race 16.

Secured to the shaft 13 is a casing 17 which is shaped to provide internally thereof an annular sump chamber 18. Lubricant is supplied (by means not shown) to the ball race 16, excess lubricant passing to the sump chamber 18.

When the parts are in the operative position as shown in FIGURE 1 and as shown in full lines in FIGURE 2, the outer end or mouth 20 of an elongated curved pipe 21 is arranged substantially tangentially to the interior of the radially outermost wall 22 of the sump chamber 18.

The pipe 21 is carried by and communicates with a cylindrical member 23 having oppositely disposed outwardly extending cam flanges 24, 25 of which the cam flange 24 is formed with a V-shaped double cam face.

The cylindrical member 23 is rotatably mounted on a tubular stem 26 which is mounted within an annular block 27. A passage 28 in the block 27 communicates both with the tubular stem 26 and with a pipe 30, the pipe 30 being carried by a fixed wall 31 which extends radially of the engine. The pipe 30 communicates with a conduit 32 which extends to the main sump (not shown) of the engine.

The sleeve 15 and casing 17 have axially extending flanges 33, 34 respectively between which there is an annular opening 35. The opening 35 is of a shape and size such as to permit the passage therethrough of the pipe 21 only when the latter is in a certain predetermined disposition with respect thereto.

The flange 33 is provided with a cam abutment member 36.

In order to assemble the parts into the operative position shown in FIGURE 1, the parts are initially brought to the position shown in FIGURE 3. The pipe 21 and its associated structure is then pushed in the direction of the arrow 37 with the result that, as the cam flange 24 rides over the sleeve 15, the pipe 21 (as shown in FIGURE 4) is rotated into the said predetermined disposition in which it lies wholly within the confines of the annular opening 35. This position of the pipe 21 is illustrated in FIGURE 2 by dotted lines.

As soon as the pipe 21 has cleared the flange 34, the cam flange 25 contacts the cam abutment member 36. Thus further pushing of the pipe 21 and associated structure in the direction of the arrow 37 causes the pipe 21 to be rotated, as illustrated in FIGURES 5 and 6, into the operative position. When the pipe 21 has assumed its operative position as shown in FIGURE 6, the annular block 27 fits within the annular opening 35 between the flanges 33 and 34, and as shown in FIGURES 2 and 6, thus closes the annular opening 35 so that in any flight attitude lubricant can only be removed through the pipe 21.

Similarly if it is required to withdraw the pipe 21 from the sump chamber 18, the cam flanges 24, 25, sleeve 15 and cam abutment member 36 cooperate to ensure that the pipe 21 is at all times appropriately positioned to make such withdrawal possible.

In operation, the rotation of the shaft 13 causes the casing 17 to be correspondingly rotated. Accordingly any lubricant within the sump chamber 18 will be forced centrifugally against the interior of the wall 22, and will therefore be scooped into the end 20 of the pipe 21 which will be stationary. Lubricant entering the pipe 21 is pumped (by means not shown) through the conduit 32 to the said main sump (not shown).

The lubricant which is maintained in an annulus around the outer periphery of the sump chamber 18 by the action of centrifugal forces produced by rotation of the sump chamber, enters the pipe 21 under the action of a dynamic pressure head induced by the rotation of the lubricant relative to the pipe.

Therefore the withdrawal of lubricant from the sump chamber 18 will not be affected by the flight disposition of the aircraft.

I claim:

1. An apparatus comprising a bearing to which lubricant is supplied, a rotatable shaft journalled within said bearing, a substantially annular sump chamber concentric of and supported by said shaft for receiving excess lubricant from said bearing, said annular sump chamber being rotated with said shaft so that any lubricant in the sump chamber is forced centrifugally against the interior of the external wall thereof, said sump chamber having an annular opening therein concentric with said shaft, a stationary annular block having a passage therethrough and positioned in and closing said annular opening, and an elongated pipe carried by said block within said sump chamber and communicating with the passage therein, said pipe having the free end thereof arranged substantially tangentially to the interior of the external wall of said sump chamber so that excess lubricant in said sump chamber is scooped into said pipe and removed therefrom through the passage in said stationary block.

2. An apparatus comprising a bearing to which lubricant is supplied, a rotatable shaft journalled within said bearing, a substantially annular sump chamber concentric of and supported by said shaft for receiving excess lubricant from said bearing, said sump chamber being rotated with said shaft so that any lubricant in the sump chamber is forced centrifugally against the interior of the external wall thereof, said sump chamber having an annular opening therein concentric with said shaft, a stationary annular block having a passage therethrough, said annular block being movable axially into and out of registration with said annular opening and when in registration therewith closing said annular opening, an elongated pipe rotatably mounted in said block and communicating with the passage therein, said pipe having a first position in which it may be moved axially through said annular opening and a second position within the sump chamber in which its free end is arranged substantially tangentially to the interior of the external wall thereof so that execss lubricant in said sump chamber is scooped into said pipe and removed therefrom through the passage in said block, and cam means operative after said pipe has been moved by said block through said opening into said sump chamber for rotating said pipe from said first position into said second position.

3. An apparatus as claimed in claim 2 including a second cam means operative when said pipe is presented to said annular opening and said block is moved axially towards and into registration with the same for maintaining said pipe in said first position until said pipe is within said sump chamber.

4. An apparatus comprising a bearing to which lubricant is supplied, a rotatable shaft journalled within said bearing, a substantially annular sump chamber concentric of and supported by said shaft for receiving excess lubricant from said bearing, said sump chamber bearing rotated with said shaft so that any lubricant in the sump chamber is forced centrifugally against the interior of the external wall thereof, said sump chamber having an annular opening therein concentric with said shaft, a stationary annular block having a passage therethrough, said annular block being movable axially into and out of registration with said annular opening and when in registration therewith closing said annular opening, a cylindrical member rotatably supported by said block, an elongated pipe carried by said cylindrical member and communicating through said cylindrical member with the passage in said block, said pipe having a first position in which it may be moved axially through said annular opening and a second position within the sump chamber in which its free end is arranged substantially tangentially to the interior of the external wall thereof so that excess lubricant in said sump chamber is scooped into said pipe and removed therefrom through the passage in said block, said cylindrical member having outwardly extending flanges thereon provided with cam faces, abutment means fixed with respect to said sump chamber, said abutment means cooperating with the cam faces of said flanges for maintaining said pipe in its first position when said block is moved axially towards and into registration with said opening and for rotating said cylinder and the pipe carried thereby after the pipe has entered the sump chamber to move said pipe from its first position to its second position.

References Cited in the file of this patent

UNITED STATES PATENTS

| | | |
|---|---|---|
| 1,685,517 | Baldwin | Sept. 25, 1928 |
| 2,754,693 | Tholl et al. | July 17, 1956 |